United States Patent [19]

Ross et al.

[11] Patent Number: 4,814,299

[45] Date of Patent: Mar. 21, 1989

[54] OPTICAL GLASS WITH REFRACTIVE INDEX 1.60, AN ABBE NUMBER 58, WITH HIGH CHEMICAL STABILITY AND RESISTANCE TO PHASE SEPARATION AND CRYSTALLIZATION

[75] Inventors: Ludwig Ross, Klein-Winternheim; Volkmar Geiler, Mainz-Finthen, both of Fed. Rep. of Germany

[73] Assignee: Schott Glaswerke, Mainz, Fed. Rep. of Germany

[21] Appl. No.: 70,154

[22] Filed: Jul. 2, 1987

Related U.S. Application Data

[63] Continuation of Ser. No. 883,431, Jul. 14, 1986, abandoned, which is a continuation of Ser. No. 645,140, Aug. 28, 1984, abandoned.

[30] Foreign Application Priority Data

Aug. 30, 1984 [DE] Fed. Rep. of Germany ....... 3331106

[51] Int. Cl.$^4$ .............................................. C03C 3/064
[52] U.S. Cl. ...................................... 501/78; 501/903
[58] Field of Search ........................... 501/77, 903, 78

[56] References Cited

U.S. PATENT DOCUMENTS

| | | | |
|---|---|---|---|
| 3,898,093 | 8/1975 | Faulstich et al. | 501/64 |
| 3,970,466 | 7/1976 | Faulstich | 501/78 |
| 4,343,908 | 8/1982 | Faulstich et al. | 501/78 |
| 4,446,241 | 5/1984 | Francel et al. | 501/77 |
| 4,520,115 | 5/1985 | Speit et al. | 501/78 |
| 4,521,524 | 6/1985 | Yamashita | 501/78 |

FOREIGN PATENT DOCUMENTS

| | | | |
|---|---|---|---|
| 63790 | 11/1982 | European Pat. Off. | 501/78 |
| 54-3115 | 11/1979 | Japan | 501/78 |
| 2145711 | 4/1985 | United Kingdom | 501/78 |

OTHER PUBLICATIONS

Doremus, Glass Science (1973), John Wiley & Sons Inc., NY, p. 53.

Kreidl and Uhlmann (1983) Glass: Science and Technology, p. 136, Academic Press, Inc. NY, NY.

*Primary Examiner*—William R. Dixon, Jr.
*Assistant Examiner*—Ann M. Knab
*Attorney, Agent, or Firm*—Millen & White

[57] ABSTRACT

An optical glass, $n_d \geq 1.60$ and $v_d \geq 58$, having a high chemical stability as well as resistance to phase separation and crystallization, comprises in percent by weight:

| | | | | | | | |
|---|---|---|---|---|---|---|---|
| $SiO_2$ | 21.5–27.0; | $B_2O_3$ | 23.5–30.0 | SrO | 16.0–24.0; |
| $La_2O_3$ | 10.0–20; | $Al_2O_3$ | 1.5–5.0; | BaO | 5.0–14.0; |
| $ZrO_2$ | 0–4.0; | $Li_2O$ | 0.5–5.0; | $Na_2O$ | 0.8–2.5; |
| $K_2O$ | 0–2.0. | | | | |

15 Claims, No Drawings

OPTICAL GLASS WITH REFRACTIVE INDEX 1.60, AN ABBE NUMBER 58, WITH HIGH CHEMICAL STABILITY AND RESISTANCE TO PHASE SEPARATION AND CRYSTALLIZATION

This application is a continuation of application Ser. No. 883,431, filed July 14, 1986, now abandoned, which is a continuation of Ser. No. 645,140, filed Aug. 28, 1984, now abandoned.

BACKGROUND OF THE INVENTION

This invention relates to optical glass having a refractive index ($n_d$) equal to or greater than 1.60 and an Abbe number ($v_d$) equal to or greater than 58.

The most relevant reference describing the state of the art in respect of this invention is U.S. Pat. No. 4,343,908, issued Aug. 10, 1982, incorporated by reference herein, along with all references cited therein.

According to this reference, glasses of the same optical type can be manufactured with higher chemical stability; however such glasses, particularly at high Abbe numbers ($\geq 60$) show a strong tendency to phase separation, as has been known for a long time in the $SiO_2/B_2O_3$ system. (See W. Vogel, Glaschemie, VEB Deutscher Verlag fur Grundstoffind, Leipzig 1979, page 152). This phase separation tendency is exacerbated by the addition of fluorine which is added for the purpose of lowering dispersion at high refractive indices ($\geq 1.620$), thereby permitting Abbe numbers of over 60.0.

Another disadvantage of the glass of U.S. Pat. No. 4,343,908 is that application of a fine-cooling treatment (10−0.3° C./h) necessary for optical glasses is no longer possible without producing clearly preceptible clouding in larger glass blocks ($\geq 1000$ cm$^3$), the clouding limit extending down to the transformation temperature. Thus, within the composition ranges of U.S. Pat. No. 4,343,908, clouding cannot be prevented in the high refractive index/Abbe range.

SUMMARY

An object of this invention is to provide optical glass of the known refractive-index/Abbe-number range $\geq 1.60/\geq 58$, which glasses have optical properties in common with conventional glasses but are distinguished by having substantially improved chemical stability and higher resistance to phase separation and crystallization.

Upon further study of the specification and appended claims, further objects and advantages of this invention will become apparent to those skilled in the art.

To produce a glass satisfying all of the aforementioned requirements (high refractive index with high Abbe number, high chemical stability, high resistance to phase separation and crystallization) it was necessary to provide a new composition. The basic glass system $SiO_2$-$B_2O_2$-$La_2O_3$-SrO, as described in U.S. Pat. No. 4,343,908 was substantially retained, the improvement comprising a significant increased alkali content and the mandatory presence of $Li_2O$ in a substantial concentration, vis-a-vis the other alkali metal oxides. These improved compositions result in glass having an improved position in the optical scale (higher refractive index, higher Abbe number) without having to use a quantity of fluorine which promotes phase-separation. In addition, even with small amounts, e.g. 0.1 to 0.5% of fluorine it has been found to be possible to mitigate the phase-separation tendency by the addition of more than 0.5%, preferably more than 1%, by weight of $Na_2O$ or $K_2O$ or a mixture thereof.

The range of compositions for the glass of this invention is set forth in Table I as follows (% by weight):

TABLE I

| Component | % by weight |
| --- | --- |
| $SiO_2$ | 21.5–27.0 |
| $B_2O_3$ | 23.5–30.0 |
| SrO | 16.0–24.0 |
| $La_2O_3$ | 10.0–20.5 |
| $Al_2O_3$ | 1.5–5.0 |
| BaO | 5.0–14.0 |
| $ZrO_2$ | 0–4.0 |
| $Li_2O$ | 0.5–5.0 |
| $Na_2O$ | 0.8–2.5 |
| $K_2O$ | 0–2.0 |
| $\Sigma Li_2O, Na_2O, K_2O$ | 1.6–5.0 |
| $F^-$ | $\leq 0.5$ |
| Ratio of $Li_2O$ to ($Na_2O + K_2O$) $\geq 0.5$. | |

A breakdown of Table I by function of the components yields the following:

Vitrifying oxides:

| | | | |
| --- | --- | --- | --- |
| $SiO_2$ | 21.5–27.0; | $B_2O_3$ | 23.5–30.0 and |
| $Al_2O_3$ | 1.5–5.0; | | |

Glass-modulating oxides:

| | | | | | |
| --- | --- | --- | --- | --- | --- |
| SrO | 16.0–24.0; | BaO | 5.0–14; | $La_2O_3$ | 10.0–20.5; |
| ZrO | 0–4.0; | $Li_2O$ | 0.5–5; | $Na_2O$ | 0.8–2.5; |
| $K_2O$ | 0–2.0; | | | | |

Sum of alkali metal oxides 1.6–5.0 with a ratio $$\frac{Li_2O}{Na_2O + K_2O} \geq 0.5,$$

and with a maximum $F^-$ content of 0.5.

Besides the foregoing, the folloing oxides may also be contained in the glass (% by weight):

| | | | | | |
| --- | --- | --- | --- | --- | --- |
| MgO | 0–2, | CaO | 0–7, | ZnO | 0–4, |
| $Y_2O_3$ | 0–5, | $WO_3$ | 0–3 | and $Gd_2O_3$ | 0–3. |

As contrasted to Japanese Pat. No. 54-003115, no $SnO_2$ is required in the glass of this invention.

The compositions of this invention produce glasses having a refractive index of preferably above 1.61, combined with Abbe numbers preferably above 59.

The glasses according to the invention satisfy the demand for high chemical stability at refractive indices $\geq 1.60$ and Abbe numbers $\geq 58$, as well as the demand for adequate resistance to phase separation and crystallization.

Fully conventional glassmaking procedures can be employed to prepare the glasses of this invention. Advantageously, the conventional crucible melting batch process (for details, see, e.g., U.S. Pat. No. 3,898,093, whose disclosure is incorporated by reference herein) or the continuous tank melting process (for details, see, e.g., U.S. Pat. No. 3,970,466, whose disclosure is incorporated by reference herein), is used.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

Table II presents the compositions of the examples of embodiments of the present invention in % by weight, and Table III presents the properties of the resultant glass.

The glasses of the examples are produced as follows:

The raw materials (oxides, carbonates, nitrates and potentially fluorides) are weighed out; a refining agent such as $As_2O_3$ in amounts of 0.1–1 wt. % is added and the whole is well mixed. The batch is melted down at approximately 1160°–1300° C. in a platinum crucible or in a ceramic smelting vessel, then refined and well homogenized with the aid of an agitator. At a casting temperature of approximately 930° C., the glass is then worked to the desired measurements.

Sample melt for 100 kg calculated glass (example 1 in tables):

| Oxide | Wt. % | Raw Material | Weight of Charge (kg) |
|---|---|---|---|
| $SiO_2$ | 24.10 | ground quartz | 24.14 |
| $B_2O_3$ | 27.60 | $H_3BO_3$ | 48.93 |
| BaO | 9.00 | $Ba(NO_3)_2$ | 15.45 |
| SrO | 19.50 | $Sr(NO_3)_2$ | 40.21 |
| $Li_2O$ | 0.60 | $Li_2CO_3$ | 1.89 |
| $Na_2O$ | 1.10 | $Na_2CO_3$ | 1.89 |
| $Al_2O_3$ | 2.80 | AlO OH | 3.61 |
| $La_2O_3$ | 14.10 | $La_2O_3$ | 14.10 |
| $ZrO_2$ | 1.10 | $ZrO_2$ | 1.10 |
| $As_2O_3$ | 0.20 | $As_2O_3$ | 0.20 |

The glasses according to the invention have a substantially improved chemical stability and a high resistance to phase separation and crystallization so that they do not need any special thermal treatment.

TABLE II

| | 1 | 2 | 3 | 4 | 5 | 6 | 7* |
|---|---|---|---|---|---|---|---|
| $SiO_2$ | 24.10 | 23.00 | 25.10 | 25.20 | 26.10 | 25.10 | 24.00 |
| $B_2O_3$ | 27.60 | 27.50 | 24.20 | 25.00 | 24.80 | 24.40 | 27.30 |
| $Al_2O_3$ | 2.80 | 3.10 | 1.70 | 2.80 | 2.70 | 3.80 | 3.50 |
| $Li_2O$ | 0.60 | 1.10 | 3.80 | 2.50 | 1.00 | 0.90 | — |
| $Na_2O$ | 1.10 | 0.80 | 0.90 | 1.00 | 1.20 | 1.10 | — |
| $K_2O$ | — | 0.50 | — | — | — | 0.30 | — |
| MgO | — | 0.70 | — | — | — | — | — |
| CaO | — | — | 2.60 | — | 0.50 | — | — |
| SrO | 19.50 | 17.80 | 18.00 | 16.50 | 17.00 | 21.10 | 19.10 |
| BaO | 9.00 | 10.00 | 6.80 | 12.10 | 8.00 | 9.00 | 9.00 |
| $La_2O_3$ | 14.10 | 14.00 | 16.20 | 13.00 | 18.00 | 12.80 | 14.80 |
| $ZrO_2$ | 1.10 | 1.00 | 0.50 | 0.20 | — | — | 1.00 |
| $Y_2O_3$ | — | — | — | 1.10 | — | — | — |
| $WO_3$ | — | — | — | — | 0.50 | — | — |
| $Gd_2O_3$ | — | — | — | — | — | 1.30 | — |
| $F^-$ | — | 0.30 | — | 0.40 | — | — | 0.24 |
| $As_2O_3$ | 0.20 | 0.20 | 0.20 | 0.20 | 0.20 | 0.20 | 0.20 |

TABLE III

| | 1 | 2 | 3 | 4 | 5 | 6 | |
|---|---|---|---|---|---|---|---|
| $n_d$ | 1.6216 | 1.6222 | 1.6291 | 1.6150 | 1.6240 | 1.6200 | 1.6191 |
| $v_d$ | 60.0 | 60.2 | 59.4 | 60.5 | 59.60 | 60.1 | 59.26 |
| $t_{SR}$(1)$_{(min)}$ | 7.1 | 6.9 | 7.5 | 6.5 | 8.0 | 9.1 | 6.90 |
| OEG$^{(2)}$ (°C.) | 1020 | 1000 | 950 | 990 | 1045 | 1030 | 1050 |
| $KG_{max}^{(3)}$ (°C.) (μm/min) | 935/0.8 | 930/0.7 | 900/0.4 | 940/1.0 | 935/0.9 | 925/0.9 | 950/1.0 |
| EB$^{(4)}$ (°C.) | ** | ** | ** | 750–810 | — | 760–800 | 620–770° C. |

$^{(1)}t_{SR}$ - time for erosion of a 1 μm layer of polished glass surface by solution pH 4.6
$^{(2)}$OEG - upper devitrification limit in gradient furnace at 60 min annealing of a previously cooled glass
$^{(3)}KG_{max}$ - position of crystallization peak and maximum crystallization growth rate,***
$^{(4)}$EB - phase separation range at annealing for 15 hours in a gradient furnace. The transformation temperatures are between 600 and 650° C.
*glass according U.S. Pat. No. 4,343,908, Example 4 glass blocks with a volume greater than 1 l. show a clearly preceptible clouding because of their tendency to phase separation due to an overlapping of the cooling temperature (Tg 628° C.) and the phase separation range (620–770° C.).
**no phase separation at all
***the faster the crystallization growth rate and the higher the crystallization temperature the worse are the production conditions.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. An optical glass with a refractive index $\geq 1.60$, an Abbe number $\geq 58$ and improved resistance to acids, phase separation and crystallization, consisting essentially of in % by weight:

| Component | % by weight |
|---|---|
| $SiO_2$ | 21.5–27.0 |
| $B_2O_3$ | 23.5–30.0 |
| SrO | 16.0–24.0 |
| $La_2O_3$ | 10.0–20.5 |
| $Al_2O_3$ | 1.5–5.0 |
| BaO | 5.0–14.0 |
| $ZrO_2$ | 0–4.0 |
| $Li_2O$ | 0.5–5.0 |
| $Na_2O$ | 0.8–2.5 |
| $K_2O$ | 0–2.0 |
| $\Sigma Li_2O, Na_2O, K_2O$ | 1.6–5.0 |
| $F^-$ | $\leq 0.5$ |
| Ratio of $Li_2O$ to $(Na_2O + K_2O)$ | $\geq 0.5$. |

2. An optical glass according to claim 1, containing no $F^-$.

3. An optical glass according to claim 1, containing 0.1 to 0.5 $F^-$ and at least 1% of $Na_2O$, $K_2O$ or a mixture thereof.

4. A glass according to claim 1, further containing, in % by weight:

| | |
|---|---|
| MgO | 0-2 |
| CaO | 0-7 |
| ZnO | 0-4 | at least one of MgO, CaO and ZnO being present in the glass.

5. A glass according to claim 1, further containing, in % by weight:

| | |
|---|---|
| $Y_2O_3$ | 0-5 |
| $WO_3$ | 0-3 |
| $Gd_2O_3$ | 0-3 | at least one of $Y_2O_3$, $WO_3$ and $Gd_2O_3$ being present in the glass.

6. A glass according to claim 4, further containing, in % by weight:

| | |
|---|---|
| $Y_2O_3$ | 0-5 |
| $WO_3$ | 0-3 |
| $Gd_2O_3$ | 0-3 | at least one of $Y_2O_3$, $WO_3$ and $Gd_2O_3$ being present in the glass.

7. A glass according to claim 1 having a refraction index of above 1.61 and an Abbe number above 59.

8. A glass according to claim 1 having no $K_2O$.

9. A glass according to claim 1 containing a smaller amount of $K_2O$ than $Na_2O$.

10. A glass according to claim 1 containing 0.80-1.10% by weight of $Na_2O$ and 0.30-0.50% by weight $K_2O$.

11. A glass according to claim 1 wherein the ratio of $Li_2O$ to the combination of $Na_2O$ and $K_2O$ is more than 1.

12. A glass according to claim 3 having no $K_2O$.

13. A glass according to claim 3 containing a smaller amount of $K_2O$ than $Na_2O$.

14. A glass according to claim 3 containing 0.80-1.10% by weight of $Na_2O$ and 0.30-0.50% by weight $K_2O$.

15. A glass according to claim 3 wherein the ratio of $Li_2O$ to the combination of $Na_2O$ and $K_2O$ is more than 1.

* * * * *

UNITED STATES PATENT AND TRADEMARK OFFICE
CERTIFICATE OF CORRECTION

PATENT NO. : 4,814,299

DATED : March 21, 1989

INVENTOR(S) : Ludwig Ross, et al

It is certified that error appears in the above-identified patent and that said Letters Patent is hereby corrected as shown below:

Title Page, Title: reads "OPTICAL GLASS WITH REFRACTIVE INDEX 1.60, AN ABBE NUMBER 58, WITH HIGH CHEMICAL STABILITY AND RESISTANCE TO PHASE SEPARATION AND CRYSTALLIZATION"

should read --"OPTICAL GLASS WITH REFRACTIVE INDEX $\geq$ 1.60, AN ABBE NUMBER $\geq$ 58, WITH HIGH CHEMICAL STABILITY AND RESISTANCE TO PHASE SEPARATION AND CRYSTALLIZATION"--

Signed and Sealed this

Tenth Day of October, 1989

Attest:

DONALD J. QUIGG

Attesting Officer

Commissioner of Patents and Trademarks